United States Patent
Faraboschi et al.

(10) Patent No.: US 7,143,268 B2
(45) Date of Patent: Nov. 28, 2006

(54) CIRCUIT AND METHOD FOR INSTRUCTION COMPRESSION AND DISPERSAL IN WIDE-ISSUE PROCESSORS

(75) Inventors: Paolo Faraboschi, Brighton, MA (US); Anthony X. Jarvis, Acton, MA (US); Mark Owen Homewood, Winscombe (GB); Geoffrey M. Brown, Watertown, MA (US); Gary L. Vondran, San Carlos, CA (US)

(73) Assignees: STMicroelectronics, Inc., Carrollton, TX (US); Hewlett-Packard Development Co., L.P., Houston, TX (US)

( * ) Notice: Subject to any disclaimer, the term of this patent is extended or adjusted under 35 U.S.C. 154(b) by 664 days.

(21) Appl. No.: 09/751,674

(22) Filed: Dec. 29, 2000

(65) Prior Publication Data

US 2002/0087830 A1   Jul. 4, 2002

(51) Int. Cl.
*G06F 9/30* (2006.01)
(52) U.S. Cl. ..................... 712/215; 712/206
(58) Field of Classification Search ............... 712/24, 712/23, 206, 215
See application file for complete search history.

(56) References Cited

U.S. PATENT DOCUMENTS

| | | | |
|---|---|---|---|
| 5,051,940 A * | 9/1991 | Vassiliadis et al. | 708/524 |
| 5,274,818 A * | 12/1993 | Vasilevsky et al. | 717/149 |
| 5,502,826 A * | 3/1996 | Vassiliadis et al. | 712/213 |
| 5,504,932 A * | 4/1996 | Vassiliadis et al. | 712/208 |
| 5,560,028 A * | 9/1996 | Sachs et al. | 712/212 |
| 5,732,234 A * | 3/1998 | Vassiliadis et al. | 712/200 |
| 5,819,058 A * | 10/1998 | Miller et al. | 712/210 |
| 6,029,240 A * | 2/2000 | Blaner et al. | 712/23 |
| 6,079,010 A * | 6/2000 | D'Arcy et al. | 712/212 |
| 6,167,503 A * | 12/2000 | Jouppi | 712/23 |

FOREIGN PATENT DOCUMENTS

| | | |
|---|---|---|
| EP | 0 652 510 | 5/1995 |
| EP | 0 962 856 | 12/1999 |
| WO | WO 98/38791 | 9/1998 |
| WO | WO 99/19792 | 4/1999 |

OTHER PUBLICATIONS

Chen, Crystal; Novick, Grege; and Shimano, Kirk. "Pipelining". © 2000 pp. 1-5 http://cse.stanford.edu/class/sophomore-college/projects-00/risc/pipelining/.*
Chien. "Superscalar Execution". © Feb. 29, 2000. Slides 6-10.*

\* cited by examiner

*Primary Examiner*—Eddie Chan
*Assistant Examiner*—Aimee J. Li
(74) *Attorney, Agent, or Firm*—Lisa K. Jorgenson; William A. Munck

(57) ABSTRACT

A data processor includes execution clusters, an instruction cache, an instruction issue unit, and alignment and dispersal circuitry. Each execution cluster includes an instruction execution pipeline having a number of processing stages, and each execution pipeline is a number of lanes wide. The processing stages execute instruction bundles, where each instruction bundle has one or more syllables. Each lane is capable of receiving one of the syllables of an instruction bundle. The instruction cache includes a number of cache lines. The instruction issue unit receives fetched cache lines and issues complete instruction bundles toward the execution clusters. The alignment and dispersal circuitry receives the complete instruction bundles from the instruction issue unit and routes each received complete instruction bundle to a correct one of the execution clusters. The complete instruction bundles are routed as a function of at least one address bit associated with each complete instruction bundle.

22 Claims, 6 Drawing Sheets

CIRCUIT AND METHOD FOR INSTRUCTION COMPRESSION AND DISPERSAL IN WIDE-ISSUE PROCESSORS

CROSS-REFERENCE TO RELATED APPLICATIONS

The present invention is related to those disclosed in the following U.S. patent applications:

1) Ser. No. 09/751,372, filed concurrently herewith, entitled "SYSTEM AND METHOD FOR EXECUTNG VARIABLE LATENCY LOAD OPERATIONS IN A DATA PROCESSOR";

2) Ser. No. 09/751,331, filed concurrently herewith, entitled "PROCESSOR PIPELINE STALL APPARATUS AND METHOD OF OPERATION";

3) Ser. No. 09/751,371, issued as U.S. Pat. No. 6,691,210, filed concurrently herewith, entitled "CIRCUIT AND METHOD FOR HARDWARE-ASSISTED SOFTWARE FLUSHING OF DATA AND INSTRUCTION CACHES";

4) Ser. No. 09/751,327, filed concurrently herewith, entitled "CIRCUIT AND METHOD FOR SUPPORTING MISALIGNED ACCESSES IN THE PRESENCE OF SPECULATIVE LOAD INSTRUCTIONS";

5) Ser. No. 09/751,377, filed concurrently herewith, entitled "BYPASS CIRCUITRY FOR USE IN A PIPELINED PROCESSOR";

6) Ser. No. 09/751,410, filed concurrently herewith, entitled "SYSTEM AND METHOD FOR EXECUTING CONDITIONAL BRANCH INSTRUCTIONS IN A DATA PROCESSOR";

7) Ser. No. 09/751,408, filed concurrently herewith, entitled "SYSTEM AND METHOD FOR ENCODING CONSTANT OPERANDS IN A WIDE ISSUE PROCESSOR";

8) Ser. No. 09/751,330, filed concurrently herewith, entitled "SYSTEM AND METHOD FOR SUPPORTING PRECISE EXCEPTIONS IN A DATA PROCESSOR HAVING A CLUSTERED ARCHITECTURE";

9) Ser. No. 09/751,678, filed concurrently herewith, entitled "SYSTEM AND METHOD FOR REDUCING POWER CONSUMPTION IN A DATA PROCESSOR HAVING A CLUSTERED ARCHITECTURE"; and 10) Ser. No. 09/751,679, filed concurrently herewith, entitled "INSTRUCTION FETCH APPARATUS FOR WIDE ISSUE PROCESSORS AND METHOD OF OPERATION".

The above applications are commonly assigned to the assignee of the present invention. The disclosures of these related patent applications are hereby incorporated by reference for all purposes as if fully set forth herein.

TECHNICAL FIELD OF THE INVENTION

The present invention is generally directed to data processors and, more specifically, to an apparatus for compressing and dispersing instructions a wide-issue data processor.

BACKGROUND OF THE INVENTION

The demand for high performance computers requires that state-of-the-art microprocessors execute instructions in the minimum amount of time. A number of different approaches have been taken to decrease instruction execution time, thereby increasing processor throughput. One way to increase processor throughput is to use a pipeline architecture in which the processor is divided into separate processing stages that form the pipeline. Instructions are broken down into elemental steps that are executed in different stages in an assembly line fashion.

A pipelined processor is capable of executing several different machine instructions concurrently. This is accomplished by breaking down the processing steps for each instruction into several discrete processing phases, each of which is executed by a separate pipeline stage. Hence, each instruction must pass sequentially through each pipeline stage in order to complete its execution. In general, a given instruction is processed by only one pipeline stage at a time, with one clock cycle being required for each stage. Since instructions use the pipeline stages in the same order and typically only stay in each stage for a single clock cycle, an N stage pipeline is capable of simultaneously processing N instructions. When filled with instructions, a processor with N pipeline stages completes one instruction each clock cycle.

The execution rate of an N-stage pipeline processor is theoretically N times faster than an equivalent non-pipelined processor. A non-pipelined processor is a processor that completes execution of one instruction before proceeding to the next instruction. Typically, pipeline overheads and other factors decrease somewhat the execution rate advantage that a pipelined processor has over a non-pipelined processor.

An exemplary seven stage processor pipeline may consist of an address generation stage, an instruction fetch stage, a decode stage, a read stage, a pair of execution (E1 and E2) stages, and a write (or write-back) stage. In addition, the processor may have an instruction cache that stores program instructions for execution, a data cache that temporarily stores data operands that otherwise are stored in processor memory, and a register file that also temporarily stores data operands.

The address generation stage generates the address of the next instruction to be fetched from the instruction cache. The instruction fetch stage fetches an instruction for execution from the instruction cache and stores the fetched instruction in an instruction buffer. The decode stage takes the instruction from the instruction buffer and decodes the instruction into a set of signals that can be directly used for executing subsequent pipeline stages. The read stage fetches required operands from the data cache or registers in the register file. The E1 and E2 stages perform the actual program operation (e.g., add, multiply, divide, and the like) on the operands fetched by the read stage and generates the result. The write stage then writes the result generated by the E1 and E2 stages back into the data cache or the register file.

Assuming that each pipeline stage completes its operation in one clock cycle, the exemplary seven stage processor pipeline takes seven clock cycles to process one instruction. As previously described, once the pipeline is full, an instruction can theoretically be completed every clock cycle.

The throughput of a processor also is affected by the size of the instruction set executed by the processor and the resulting complexity of the instruction decoder. Large instruction sets require large, complex decoders in order to maintain a high processor throughput. However, large complex decoders tend to increase power dissipation, die size and the cost of the processor. The throughput of a processor also may be affected by other factors, such as exception handling, data and instruction cache sizes, multiple parallel instruction pipelines, and the like. All of these factors increase or at least maintain processor throughput by means of complex and/or redundant circuitry that simultaneously increases power dissipation, die size and cost.

In many processor applications, the increased cost, increased power dissipation, and increased die size are tolerable, such as in personal computers and network servers that use x86-based processors. These types of processors include, for example, INTEL PENTIUM™ processors and AMD ATHLON™ processors.

However, in many applications it is essential to minimize the size, cost, and power requirements of a data processor. This has led to the development of processors that are optimized to meet particular size, cost and/or power limits. For example, the recently developed TRANSMETA CRUSOE™ processor greatly reduces the amount of power consumed by the processor when executing most x86 based programs. This is particularly useful in laptop computer applications. Other types of data processors may be optimized for use in consumer appliances (e.g., televisions, video players, radios, digital music players, and the like) and office equipment (e.g., printers, copiers, fax machines, telephone systems, and other peripheral devices). The general design objectives for data processors used in consumer appliances and office equipment are the minimization of cost and complexity of the data processor.

The presence of multiple functional units in processor pipelines allows multiple operations to be explicitly encoded (or compressed) in a single instruction. These types of processors are generically referred to as wide-issue processors or very large instruction word (VLIW) processors. VLIW processors implement an instruction alignment and dispersal block that is responsible for aligning fetched instructions with the correct execution pipeline and dispersing the aligned instructions for execution.

Some VLIW processors, such as the PHILIPS TRIMEDIA™ processor and the MULTIFLOW TRACE™ processor, fetch compressed instructions from memory and load decompressed instructions into the instruction cache. The advantage to this technique is that it does not occur on the critical execution path. The disadvantage is that it wastes instruction cache space. Other VLIW processors, such as TEXAS INSTRUMENTS C6XXX processors and IA-64 processors, store compressed instructions in the instruction cache and perform instruction dispersal and alignment on instruction fetch. In these types of VLIW processor, the decompression hardware is on the critical instruction and hence temporal efficiency is important. In either case, there are two issues that a compression scheme must address: 1) identifying the boundaries between instructions and 2) compressing the operations within instructions.

Because VLIW instructions may consist of multiple machine words encoding multiple operations, the following terminology is used to clarify different types of instruction-related data quantities. A bundle is a group of operations to be executed simultaneously. A bundle is encoded as a sequence of syllables. A syllable is fixed-size (e.g., 16 bits, 32 bits, and the like) unit of addressing. Syllable size is specific to each type of processor implementation.

Instruction alignment and dispersal units in prior art processors have taken one of three general approaches in defining how syllables comprising a bundle are decompressed. One approach involves the use of a separate syllable template in the encoded instruction. The MULTIFLOW TRACE™ processor, the earliest commercial VLIW, used a bundle format that consisted of one or more mask syllables followed by syllables that encoded zero to N operations. The mask syllables described the layout of the remainder of the bundle. Specifically, the mask syllables defined the functional units required by, and hence the dispersal of, the operations specified by the remaining syllables in the bundle. On instruction fill, a bundle was fully expanded so that the resulting instruction in the cache consisted of one syllable per functional unit in the machine with a particular syllable encoding denoting a null operation. The instruction fetch stage then consisted of simply reading the contents of a decompressed instruction cache entry. The bundle length is implicit in the mask encoding.

The second approach to defining how syllables comprising a bundle are decompressed involves the use of dispersal bits within each operation. TI C6XXX processors use bits within each operation syllable to determine how an instruction bundle should be dispersed and a bit in each syllable to be used as an end-of-bundle marker. In order to expand a bundle, it is necessary to examine each syllable in order to determine how to route the syllable to a functional unit.

The third approach to defining how syllables comprising a bundle are decompressed involves the use of template bits within a block of memory to indicate how words within that block should be combined to form instruction bundles. IA-64 processors use dedicated template bits within each memory block to describe the dispersal of the syllables encoded in the memory block. This template describes both bundle boundaries and the dispersal of operations.

A common implementation issue in VLIW processors is balancing the requirement of efficient instruction encoding with the requirement of efficient instruction issue hardware. Problems arise because the average static parallelism of a program can be significantly lower than the available issue slots. The most extreme solution requires that all instructions provide an operation for each available issue slot, but allows explicit null operations for those issue slots that cannot be effectively used by a program. While such a solution requires no special hardware in the instruction issue unit, it is extremely inefficient in instruction memory utilization.

Therefore, there is a need in the art for a pipelined data processor that provides an improved mechanism for encoding compressed instructions in memory and for decompressing the instructions on either instruction cache fill or instruction fetch. In particular, there is a need for a compression technique that balances the efficiency of the compression algorithm with the space and time complexity of the decompression hardware. More particularly, there is a need for an instruction decompression and dispersal scheme that achieves a good balance between memory utilization and hardware complexity.

SUMMARY OF THE INVENTION

To address the above-discussed deficiencies of the prior art, it is a primary object of the present invention to provide improved bundle alignment and dispersal circuitry for use in a data processor. According to an advantageous embodiment of the present invention, the data processor includes execution clusters, an instruction cache, an instruction issue unit, and alignment and dispersal circuitry. Each execution cluster includes an instruction execution pipeline having a number of processing stages, and each execution pipeline is a number of lanes wide. The processing stages execute instruction bundles, where each instruction bundle has one or more syllables. Each lane is capable of receiving one of the syllables of an instruction bundle. The instruction cache includes a number of cache lines. The instruction issue unit receives fetched cache lines and issues complete instruction bundles toward the execution clusters. The alignment and dispersal circuitry receives the complete instruction bundles from the instruction issue unit and routes each received complete instruction bundle to a correct one of the execution clusters. The complete instruction bundles are routed as a function of at least one address bit associated with each complete instruction bundle.

According to one embodiment of the present invention, the alignment and dispersal circuitry routs each of the received complete instruction bundles to the correct execution cluster as a function of at least one address bit associated with at least one syllable in each complete instruction bundle.

According to another embodiment of the present invention, the alignment and dispersal circuitry routs each of the received complete instruction bundles to the correct execution cluster as a function of a cluster bit associated with each complete instruction bundle.

According to still another embodiment of the present invention, the alignment and dispersal circuitry routs each of the received complete instruction bundles to the correct execution cluster as a function of a stop bit associated with at least one syllable in each complete instruction bundle.

According to yet another embodiment of the present invention, the alignment and dispersal circuitry comprises multiplexer circuitry capable of routing each received complete instruction bundle to any one of the execution clusters.

According to a further embodiment of the present invention, the alignment and dispersal circuitry comprises control logic circuitry capable of controlling the multiplexer circuitry.

According to a still further embodiment of the present invention, the control logic circuitry controls the multiplexer circuitry as a function of at least one of: 1) the at least one address bit associated with each complete instruction bundle; 2) at least one address bit associated with at least one syllable in each complete instruction bundle; and 3) a cluster bit associated with each complete instruction bundle.

In one embodiment of the present invention, each execution pipeline is four lanes wide.

In another embodiment of the present invention, the data processor includes three execution clusters.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor.

Figure 1:
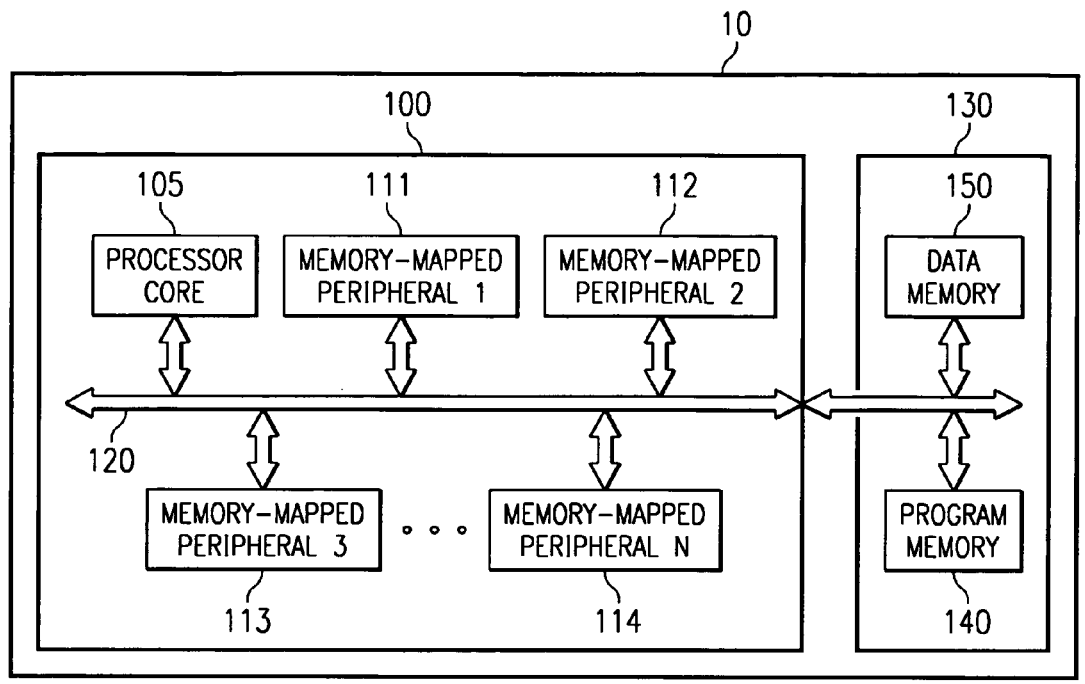
FIG. 1 is a block diagram of a processing system that contains a data processor in accordance with the principles of the present invention.

FIG. 1 is a block diagram of processing system 10, which contains data processor 100 in accordance with the principles of the present invention. Data processor 100 comprises processor core 105 and N memory-mapped peripherals interconnected by system bus 120. The N memory-mapped peripherals include exemplary memory-mapped peripherals 111-114, which are arbitrarily labeled Memory-Mapped Peripheral 1, Memory-Mapped Peripheral 2, Memory-Mapped Peripheral 3, and Memory-Mapped Peripheral N. Processing system 10 also comprises main memory 130. In an advantageous embodiment of the present invention, main memory 130 may be subdivided into program memory 140 and data memory 150.

The cost and complexity of data processor 100 is minimized by excluding from processor core 105 complex functions that may be implemented by one or more of memory-mapped peripherals 111–114. For example, memory-mapped peripheral 111 may be a video codec and memory-mapped peripheral 112 may be an audio codec. Similarly, memory-mapped peripheral 113 may be used to control cache flushing. The cost and complexity of data processor 100 is further minimized by implementing extremely simple exception behavior in processor core 105, as explained below in greater detail.

Processing system 10 is shown in a general level of detail because it is intended to represent any one of a wide variety of electronic devices, particularly consumer appliances. For example, processing system 10 may be a printer rendering system for use in a conventional laser printer. Processing system 10 also may represent selected portions of the video and audio compression-decompression circuitry of a video playback system, such as a video cassette recorder or a digital versatile disk (DVD) player. In another alternative embodiment, processing system 10 may comprise selected portions of a cable television set-top box or a stereo receiver. The memory-mapped peripherals and a simplified processor core reduce the cost of data processor 100 so that it may be used in such price sensitive consumer appliances.

In the illustrated embodiment, memory-mapped peripherals 111–114 are shown disposed within data processor 100 and program memory 140 and data memory 150 are shown external to data processor 100. It will be appreciated by those skilled in the art that this particular configuration is shown by way of illustration only and should not be construed so as to limit the scope of the present invention in any way. In alternative embodiments of the present invention, one or more of memory-mapped peripherals 111–114 may be externally coupled to data processor 100. Similarly, in another embodiment of the present invention, one or both of program memory 140 and data memory 150 may be disposed on-chip in data processor 100.

Figure 2:
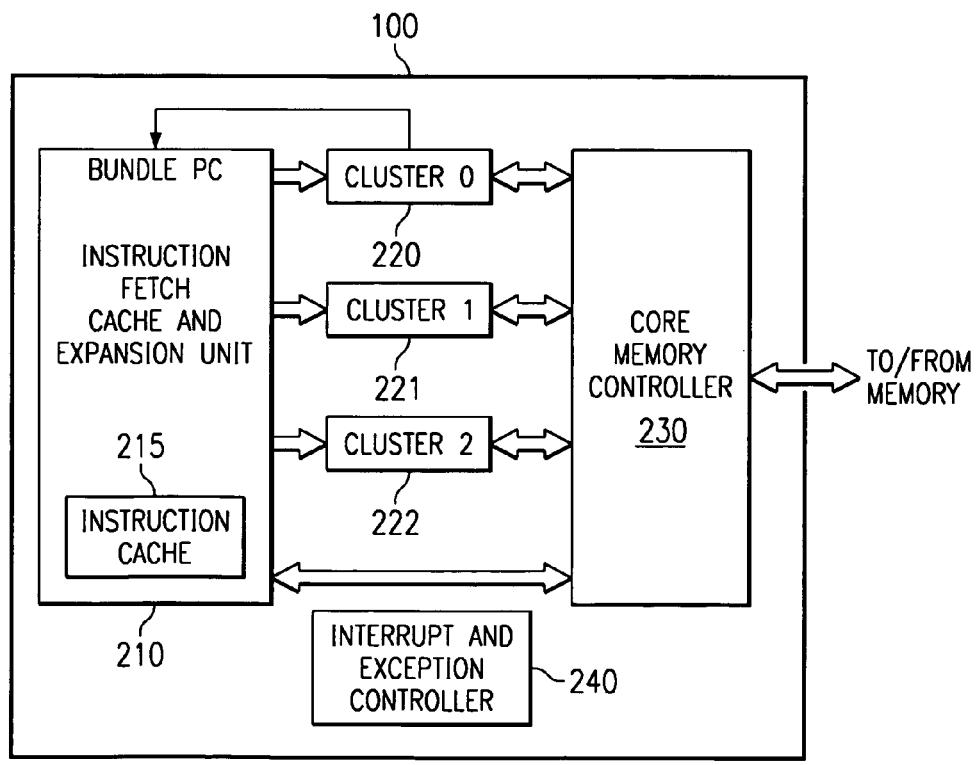
FIG. 2 illustrates the exemplary data processor in greater detail according to one embodiment of the present invention.

FIG. 2 is a more detailed block diagram of exemplary data processor 100 according to one embodiment of the present invention. Data processor 100 comprises instruction fetch cache and expansion unit (IFCEXU) 210, which contains instruction cache 215, and a plurality of clusters, including exemplary clusters 220–222. Exemplary clusters 220–222 are labeled Cluster 0, Cluster 1 and Cluster 2, respectively. Data processor 100 also comprises core memory controller 230 and interrupt and exception controller 240.

A fundamental object of the design of data processor 100 is to exclude from the core of data processor 100 most of the functions that can be implemented using memory-mapped peripherals external to the core of data processor 100. By way of example, in an exemplary embodiment of the present invention, cache flushing may be efficiently accomplished using software in conjunction with a small memory-mapped device. Another object of the design of data processor 100 is to implement a statically scheduled instruction pipeline with an extremely simple exception behavior.

Clusters 220–222 are basic execution units that comprise one more arithmetic units, a register file, an interface to core memory controller 230, including a data cache, and an inter-cluster communication interface. In an exemplary embodiment of the present invention, the core of data processor 100 may comprise only a single cluster, such as exemplary cluster 220.

Because conventional processor cores can execute multiple simultaneously issued operations, the traditional word "instruction" is hereby defined with greater specificity. For the purposes of this disclosure, the following terminology is adopted. An "instruction" or "instruction bundle" is a group of simultaneously issued operations encoded as "instruction syllables". Each instruction syllable is encoded as a single machine word. Each of the operations constituting an instruction bundle may be encoded as one or more instruction syllables. Hereafter, the present disclosure may use the shortened forms "instruction" and "bundle" interchangeably and may use the shortened form "syllable." In an exemplary embodiment of the present invention, each instruction bundle consists of 1 to 4 instruction syllables. Flow control operations, such as branch or call, are encoded in single instruction syllables.

Figure 3:
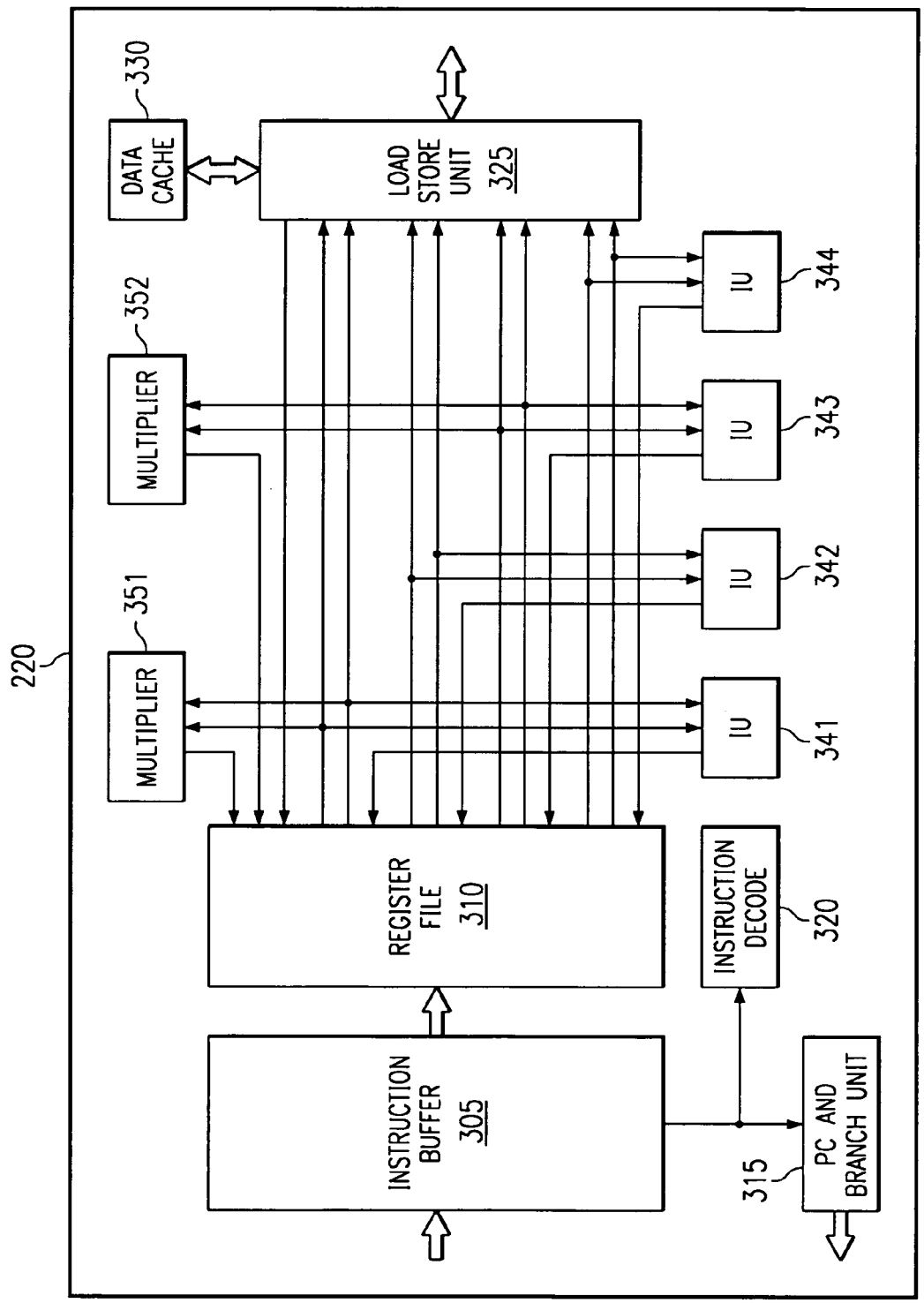
FIG. 3 illustrates a cluster in the exemplary data processor according to one embodiment of the present invention.

FIG. 3 is a more detailed block diagram of cluster 220 in data processor 100 according to one embodiment of the present invention. Cluster 220 comprises instruction buffer 305, register file 310, program counter (PC) and branch unit 315, instruction decoder 320, load store unit 325, data cache 330, integer units 341–344, and multipliers 351–352. Cluster 220 is implemented as an instruction pipeline.

Instructions are issued to an operand read stage associated with register file 310 and then propagated to the execution units (i.e., integer units 341–344, multipliers 351–352). Cluster 220 accepts one bundle comprising one to four syllables in each cycle. The bundle may consist of any combination of four integer operations, two multiplication operations, one memory operation (i.e., read or write) and one branch operation. Operations that require long immediates (constants) require two syllables.

In specifying a cluster, it is assumed that no instruction bits are used to associate operations with functional units. For example, arithmetic or load/store operations may be placed in any of the four words encoding the operations for a single cycle. This may require imposing some addressing alignment restrictions on multiply operations and long immediates (constants).

This following describes the architectural (programmer visible) status of the core of data processor 100. One design objective of data processor 100 is to minimize the architectural status. All non-user visible status information resides in a memory map, in order to reduce the number of special instructions required to access such information.

Program Counter

In an exemplary embodiment of the present invention, the program counter (PC) in program counter and branch unit 315 is a 32-bit byte address pointing to the beginning of the current instruction bundle in memory. The two least significant bits (LSBs) of the program counter are always zero. In operations that assign a value to the program counter, the two LSBs of the assigned value are ignored.

Register File 310

In an exemplary embodiment, register file 310 contains 64 words of 32 bits each. Reading Register 0 (i.e., R0) always returns the value zero.

Link Register

Register 63 (i.e., R63) is used to address the link register by the call and return instructions. The link register (LR) is a slaved copy of the architecturally most recent update to R63. R63 can be used as a normal register, between call and return instructions. The link register is updated only by writes to R63 and the call instruction. At times the fact that the link register is a copy of R63 and not R63 itself may be visible to the programmer. This is because the link register and R63 get updated at different times in the pipeline. Typically, this occurs in the following cases:

1) ICALL and IGOTO instructions—Since these instructions are executed in the decode stage, these operations require that R63 be stable. Thus, R63 must not be modified in the instruction bundle preceding one of these operations. Otherwise unpredictable results may occur in the event of an interrupt; and 2) An interrupt or exception may update the link register incorrectly. Thus, all interrupt and exception handlers must explicitly write R63 prior to using the link register through the execution of an RFI, ICALL or IGOTO instruction. This requirement can be met with a simple MOV instruction from R63 to R63.

Branch Bit File

The branch architecture of data processor 100 uses a set of eight (8) branch bit registers (i.e., B0 through B7) that may be read or written independently. In an exemplary embodiment of the present invention, data processor 100 requires at least one instruction to be executed between writing a branch bit and using the result in a conditional branch operation.

Control Registers

A small number of memory mapped control registers are part of the architectural state of data processor 100. These registers include support for interrupts and exceptions, and memory protection.

The core of data processor 100 is implemented as a pipeline that requires minimal instruction decoding in the early pipeline stages. One design objective of the pipeline of data processor 100 is that it support precise interrupts and exceptions. Data processor 100 meets this objective by updating architecturally visible state information only during a single write stage. To accomplish this, data processor 100 makes extensive use of register bypassing circuitry to minimize the performance impact of meeting this requirement.

Figure 4:
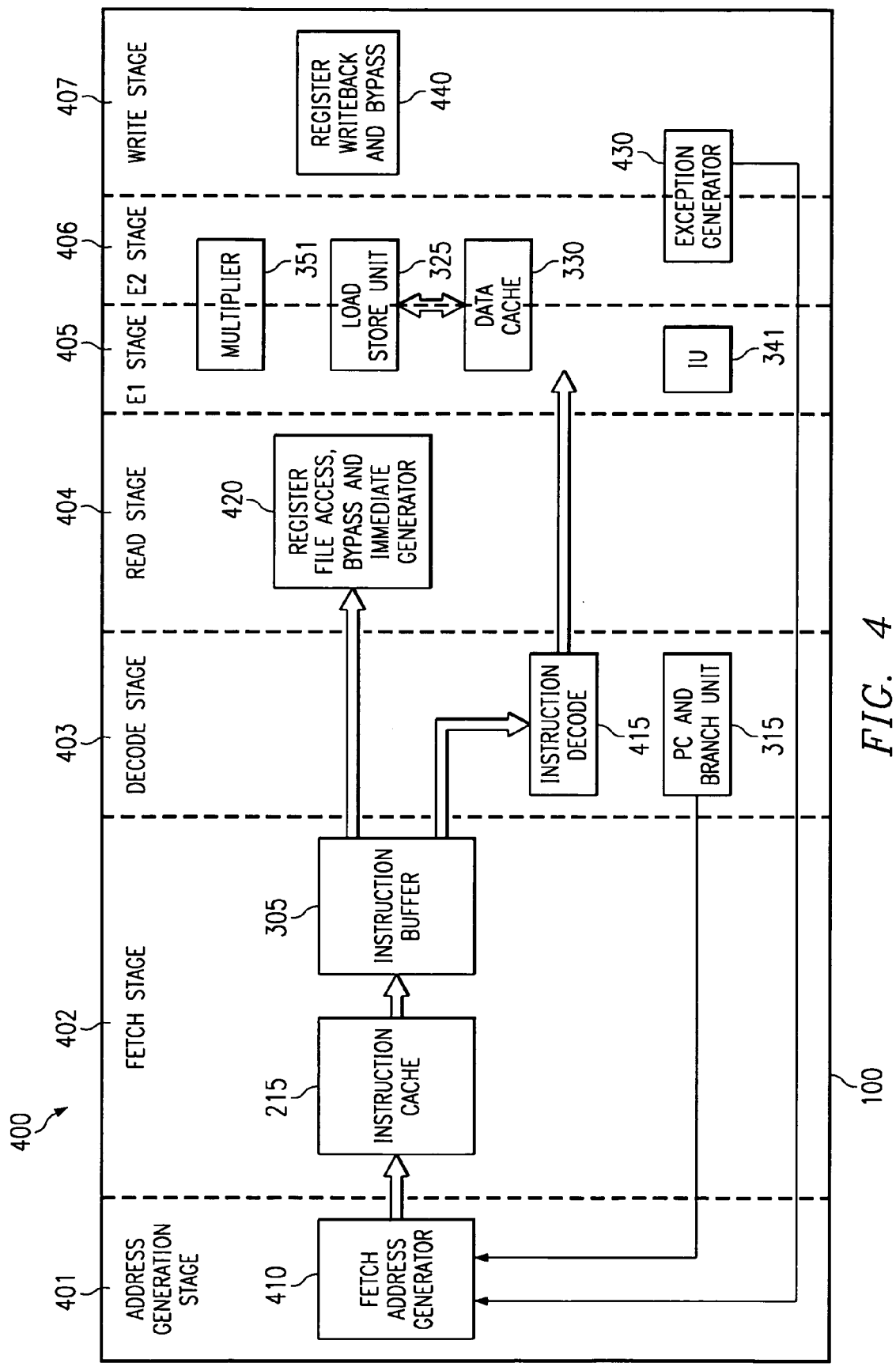
FIG. 4 illustrates the operational stages of the exemplary data processor according to one embodiment of the present invention.

FIG. 4 is a block diagram illustrating the operational stages of pipeline 400 in exemplary data processor 100 according to one embodiment of the present invention. In the illustrated embodiment, the operational stages of data processor 100 are address generation stage 401, fetch stage 402, decode stage 403, read stage 404, first execution (E1) stage 405, second execution (E2) stage 406 and write stage 407.

Address Generation Stage 401 and Fetch Stage 402

Address generation stage 401 comprises a fetch address generator 410 that generates the address of the next instruction to be fetched from instruction cache 215. Fetch address generator 410 receives inputs from exception generator 430 and program counter and branch unit 315. Fetch address generator 410 generates an instruction fetch address (FADDR) that is applied to instruction cache 215 in fetch stage 402 and to an instruction protection unit (not shown) that generates an exception if a protection violation is found. Any exception generated in fetch stage 402 is postponed to write stage 407. Instruction buffer 305 in fetch stage 402 receives instructions as 128-bit wide words from instruction cache 215 and the instructions are dispatched to the cluster.

Decode Stage 403

Decode stage 403 comprises instruction decode block 415 and program counter (PC) and branch unit 315. Instruction decode block 415 receives instructions from instruction buffer 305 and decodes the instructions into a group of control signals that are applied to the execution units in E1 stage 405 and E2 stage 406. Program counter and branch unit 315 evaluates branches detected within the 128-bit wide words. A taken branch incurs a one cycle delay and the instruction being incorrectly fetched while the branch instruction is evaluated is discarded.

Read Stage 404

In read stage 404, operands are generated by register file access, bypass and immediate (constant) generation block 420. The sources for operands are the register files, the constants (immediates) assembled from the instruction bundle, and any results bypassed from operations in later stages in the instruction pipeline.

E1 Stage 405 and E2 Stage 406

The instruction execution phase of data processor 100 is implemented as two stages, E1 stage 405 and E2 stage 406 to allow two cycle cache access operations and two cycle multiplication operations. Exemplary multiplier 351 is illustrated straddling the boundary between E1 stage 405 and E2 stage 406 to indicate a two cycle multiplication operation. Similarly, load store unit 325 and data cache 330 are illustrated straddling the boundary between E1 stage 405 and E2 stage 406 to indicate a two cycle cache access operation. Integer operations are performed by integer units, such as IU 341 in E1 stage 405. Exceptions are generated by exception generator 430 in E2 stage 406 and write stage 407.

Results from fast operations are made available after E1 stage 405 through register bypassing operations. An important architectural requirement of data processor 100 is that if the results of an operation may be ready after E1 stage 405, then the results are always ready after E1 stage 405. In this manner, the visible latency of operations in data processor 100 is fixed.

Write Stage 407

At the start of write stage 407, any pending exceptions are raised and, if no exceptions are raised, results are written by register write back and bypass block 440 into the appropriate register file and/or data cache location. In data processor 100, write stage 407 is the "commit point" and operations reaching write stage 407 in the instruction pipeline and not "excepted" are considered completed. Previous stages (i.e., address generation, fetch, decode, read, E1, E2) are temporally prior to the commit point. Therefore, operations in address generation stage 401, fetch stage 402, decode stage 403, read stage 404, E1 stage 405 and E2 stage 406 are flushed when an exception occurs and are acted upon in write stage 407.

As the above description indicates, data processor 100 is a very large instruction word (VLIW) device that allow the parallel execution of multiple instructions in two or more instruction pipelines in clusters 220–222. In an exemplary embodiment, instruction cache 215 comprises cache lines that are 512 bits (i.e., 64 bytes) long. Each syllable (i.e., smallest instruction size) comprises 32 bits (i.e., 4 bytes), such that a cache line comprises 16 syllables. Each instruction syllable is encoded as a single 32-bit machine word.

Instructions are fetched from instruction cache 215 in groups of four syllables (i.e., 128 bits). A complete instruction may comprise one, two, three or four syllables. The fetched syllables are issued into one of four issues lanes leading into the instruction pipeline. The four issue lanes are referred to as Issue Lane 0, Issue Lane 1, Issue Lane 2, and Issue Lane 3. Because instructions are of variable length and because a branch instruction may fetch instructions starting at any point in instruction cache 215, there is no guarantee that all of the syllables in an instruction will be fetched in the same cache access. There also is no guarantee that a particular syllable in an instruction will be aligned to a particular issue lane in clusters 220–222.

In order to minimize the amount of delay incurred in fetching instructions, the present invention implements an instruction issue unit comprising a sequence of instruction issue unit buffers (IIUBs) that temporarily store the syllables of an instruction until all syllables of the instruction are present. The complete instruction, consisting of one to four syllables, is then issued into the four issues lanes of the pipeline. If an instruction has less than four syllables, one or more no-operation (NOP) instructions are issued into the unused issue lanes. In the exemplary embodiment that follows, two instruction issue unit buffers are used to buffer up to four 32-bit syllables.

However, it should be understood that the selection of these values is by way of example only and should not be construed to limit the scope of the present invention. Those skilled in the art will recognize that other syllable size, buffer size and instruction sizes may be used. For example, in an alternate embodiment of the present invention, a syllable may comprise eight bits, sixteen bits, sixty-four bits, or the like, rather than thirty-two bits. Also, the instruction issue unit buffers may hold eight syllables, twelve syllables, sixteen syllables, or the like, instead of four syllables.

Figure 5:
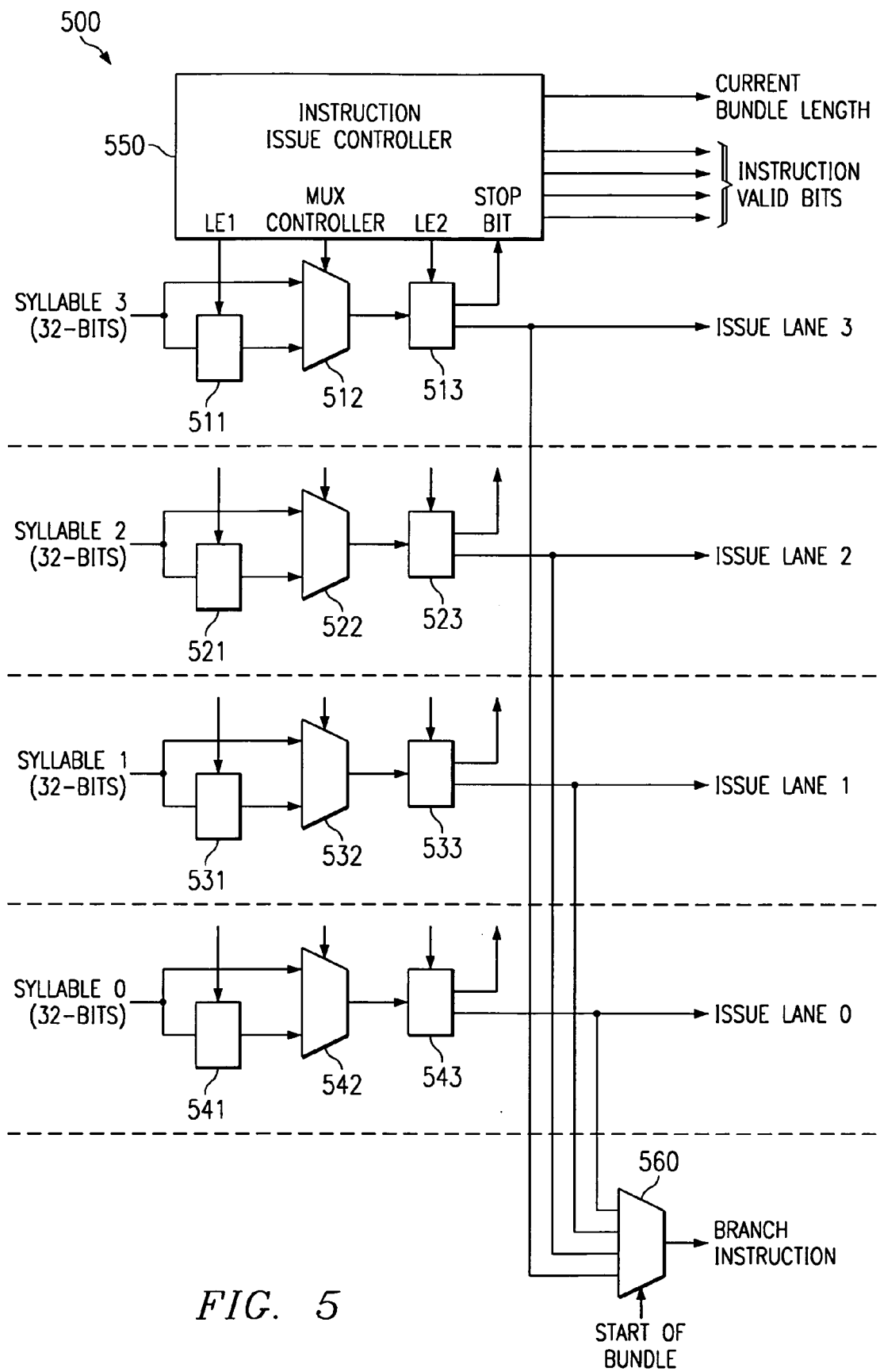
FIG. 5 is a block diagram illustrating selected portions of an instruction issue unit according to one embodiment of the present invention.

FIG. 5 is a block diagram illustrating selected portions of instruction issue unit 500 according to one embodiment of the present invention. Instruction issue unit 500 comprises instruction issue controller 550, registers 511, 521, 531 and 541, multiplexers (MUXS) 512, 522, 532 and 542, registers 513, 523, 533 and 543, and MUX 560. Registers 513, 523, 533, and 543 comprise a first instruction issue unit buffer, referred to hereafter as Instruction Issue Unit Buffer 0 (IIUB0). Registers 511, 521, 531, and 541 comprise a second instruction issue unit buffer, referred to hereafter as Instruction Issue Unit Buffer 1 (IIUB1).

The alignment of cache accesses to instruction cache 215 is determined by the branch target alignment. Each cache access after an access to a branch target fetches four syllables using the same alignment until the next taken branch occurs or a cache line boundary is crossed. Each line of the cache is organized as four independently addressable cache banks aligned with four issue lanes. The first cache bank holds Syllable 0 and is aligned with the first issue lane, referred to as Issue Lane 0. The second cache bank holds Syllable 1 and is aligned with the second issue lane, referred to as Issue Lane 1. The third cache bank holds Syllable 2 and is aligned with the third issue lane, referred to as Issue Lane 2. The fourth cache bank holds Syllable 3 and is aligned with the fourth issue lane, referred to as Issue Lane 3.

Since there is no guarantee that the first syllable of an instruction is aligned to particular cache bank of issue lane, a branch address may access an instruction aligned starting in any issue lane and cache bank. Thus, a four syllable instruction may begin in the third cache bank (i.e., Syllable 2 position) and be aligned to Issue Lane 2. For example, if Instruction A comprises four syllables A0, A1, A2 and A3, the four syllables may be fetched into Issue Lane 2, Issue Lane 3, Issue Lane 0, and Issue Lane 1. A branch instruction is always indicated by the first syllable in an instruction bundle. Hence, the outputs of registers 513, 523, 533 and 543 are input to separate channels of multiplexer (MUX) 560 and are individually selected by the START OF BUNDLE control signal.

Instruction issue controller 550 controls the transfer of Syllable 3, Syllable 2, Syllable 1 and Syllable 0 from instruction cache 215 to Issue Lane 3, Issue Lane 2, Issue Lane 1, and Issue Lane 0, respectively. A Stop bit is use in the highest syllable of an instruction bundle to indicate the end of the bundle. Thus, in a three syllable instruction bundle comprising syllables A0, A1 and A2, the Stop bit is in syllable A2.

Ideally, each of the four syllables in an instruction cache fetch are loaded from instruction cache 215 directly into the empty registers in instruction issue unit (IIU) buffer 0 (i.e., registers 513, 523, 533 and 543). In such a case, instruction issue controller 550 sets the MUX CONTROL signal to switch all four syllables to the inputs of registers 513, 523, 533 and 543. Instruction issue controller 550 also selectively enables each of registers 513, 523, 533 and 543 using individual Load Enable 2 (LE2) signals.

However, if previously fetched syllables are still in one or more of registers 513, 523, 533 and 543 when the next instruction bundle is fetched, instruction issue controller 550 sets the individual MUX CONTROL signals to selectively switch the corresponding ones of the four syllables in the next instruction to the inputs of registers 511, 521, 531 and 541 (i.e., Instruction Issue Unit (IIU) Buffer 1). Instruction issue controller 550 also selectively enables each of registers 511, 521, 531 and 541 using individual Load Enable 1 (LE1) signals. Thus, a syllable may be delayed temporarily in IIU Buffer 1 until the corresponding register in IIU Buffer 0 becomes empty.

Figure 6:
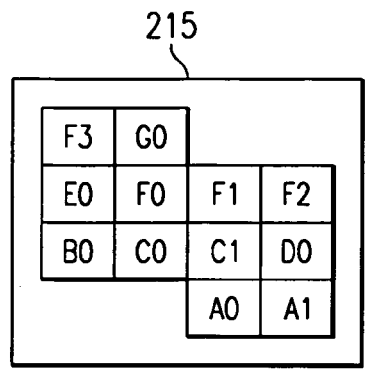
FIG. 6 is a block diagram illustrating the contents of an instruction cache in the exemplary data processor according to one embodiment of the present invention.

The operation of instruction issue unit 500 may best be understood with reference to FIG. 6 and FIGS. 7A–7D. FIG. 6 is a block diagram illustrating the contents of instruction cache 215 in exemplary data processor 100 according to one embodiment of the present invention. FIG. 7A–7D are block diagrams illustrating the flow of instruction bundles and syllables through Instruction Issue Unit Buffer 0 (IIUB0) and Instruction Issue Unit Buffer 1 (IIUB1) according to one embodiment of the present invention.

Instruction cache 215 contains an exemplary sequence of seven instruction bundles, referred to as Instructions A, B, C, D, E, F and G within a single cache line. Instruction A comprises two syllables, A0 and A1. Instruction B comprises one syllable, B0. Instruction C comprises two syllable, C0 and C1. Instruction D comprises one syllable, D0. Instruction E comprises one syllable, E0. Instruction F comprises four syllables, F0, F1, F2 and F3. Finally, Instruction G comprises one syllable, G0.

Initially, IIUB0 and IIUB1 are empty and a branch instruction begins fetching syllables in groups of four beginning at syllable A0. Since IIUB0 is empty, instruction issue controller 550 sets MUX 512, MUX 522, MUX 532 and MUX 542 so that the first four syllables, A0, A1, B0 and C0, are fetched into IIUB0. Syllable A0 is in the Syllable 2 slot in FIG. 5 and therefore is aligned with Issue Lane 2 (register 523). Correspondingly, Syllable A1 is aligned with Issue Lane 3 (register 513), Syllable B0 is aligned with Issue Lane 0 (register 543), and Syllable C01 is aligned with Issue Lane 1 (register 533).

Figure 7A:
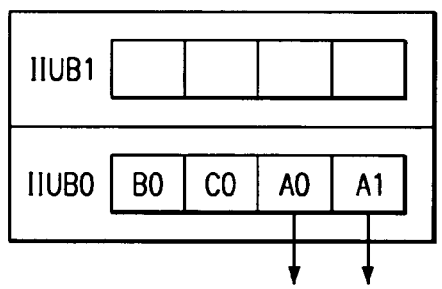
FIG. 7A–7D are block diagrams illustrating the flow of instruction bundles and syllables through Instruction Issue Unit Buffer 0 (IIUB0) and Instruction Issue Unit Buffer 1 (IIUB1) according to one embodiment of the present invention.

FIG. 7A shows the positions of A0, A1, B0 and C0 after they are loaded into IIUB0. After A0, A1, B0 and C0 are loaded into IIUB0, instruction issue controller 550 detects the Stop bit in A1, indicating that all of Instruction A has been fetched, and issues A0 and A1 into Issue Lanes 2 and 3. Syllables B0 and C0 remain in IIUB0. IIUB1 (i.e., registers 511, 521, 531 and 541) is still empty.

Figure 7B:
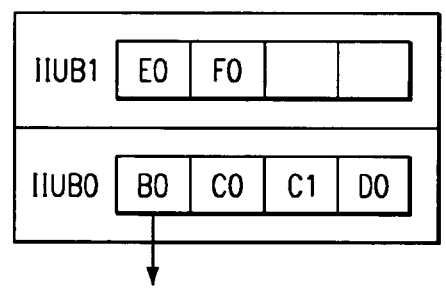

At this point, the next four syllables (C1, D0, E0 and F0) are fetched. Since IIUB0 is only partially empty, instruction issue controller 550 sets MUX 512 and MUX 522 so that syllables C1 and D0 are fetched into IIUB0 by the LE2 signal. Instruction issue controller 550 also sets MUX 532 and MUX 542 so that the syllables E0 and F0 can only be fetched into IIUB1 by the LE1 signal. FIG. 7B shows the positions of C1, D0, E0 and F0 after they are loaded into IIUB0 and IIUB1. After C1, D0, E0 and F0 are loaded, instruction issue controller 550 detects the Stop bit in B0, indicating that all of Instruction B has been fetched, and issues B0 into Issue Lane 0. Syllables C0, C1 and D0 remain in IIUB0. IIUB1 contains E0 and F0.

Figure 7C:
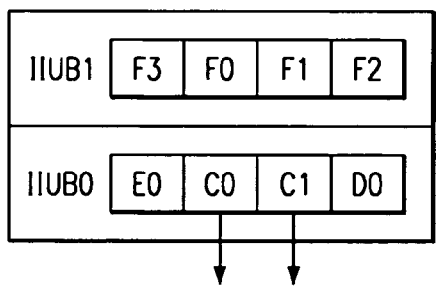
Figure 7D:
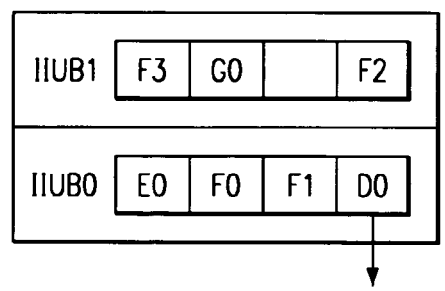

At this point, the next four syllables (F1, F2, F3 and G0) are fetched. Since register 543 in IIUB0 is empty after syllable B0 is issued into Issue Lane 0, instruction issue controller 550 sets MUX 542 so that syllable E0 is transferred from IIUB1 to IIUB0 by the LE2 signal. Instruction issue controller 550 also sets MUX 512, MUX 522 and MUX 542 so that the syllables F1, F2 and F3 are fetched into IIUB1 by the LE1 signal. The LE1 signal is not applied to register 531, which still holds syllable F0 from the previous fetch. Therefore, syllable G0 is not written to register 531 in IIUB1. FIG. 7c shows the positions of E0, F1, F2, and F3 after they are loaded into IIUB0 and IIUB1. After E0, F1, F2 and F3 are loaded, instruction issue controller 550 detects the Stop bit in C1, indicating that all of Instruction C has been fetched, and issues C0 and C1 into Issue Lanes 1 and 2. Syllables D0 and E0 remain in IIUB0. IIUB1 contains F3, F0, F1 and F2.

At this point, the four syllables F1, F2, F3 and G0 are refetched in order to fetch G0, which was not loaded on the previous fetch. Since registers 533 and 523 in IIUB0 are empty after syllables C0 and C1 are issued, instruction issue controller 550 sets MUX 522 and MUX 532 so that syllables F0 and F1 are transferred from IIUB1 to IIUB0 by the LE2 signal. Instruction issue controller 550 also sets MUX 532 so that the syllable G0 is fetched into IIUB1 by the LE1 signal. The LE1 signal is not applied to registers 541 and 511, which still hold syllables F3 and F2 from the previous fetch. The LE1 signal is also not applied to register 521, which is empty after syllable F1 is transferred to IIUB0. FIG. 7C shows the positions of F0, F1 and G0 after F0, F1 and G0 are loaded into IIUB0 and IIUB1. After F0, F1 and G0 are loaded, instruction issue controller 550 detects the Stop bit in D0, indicating that all of Instruction D has been fetched, and issues D0 into Issue Lane 3. Syllables E0, F0 and F1 remain in IIUB0. IIUB1 contains F3, G0 and F2.

As FIG. 6 and FIGS. 7A–7D demonstrate, instruction issue unit 500 continually fetches syllables as far "forward" as possible in IIUB0 and IIUB1. If IIUB0 and IIUB1 are empty, syllables are transferred directly into IIUB0, the "forward-most" instruction buffer. If a register in IIUB0 is not empty, the corresponding incoming syllable is instead loaded into IIUB1 and subsequently advances into IIUB0 when the corresponding register becomes empty. In alternate embodiments, one or more additional layers of buffering may be added by inserting additional banks of registers and multiplexers in front of IIUB0 and IIUB1.

By way of example, if a third layer of buffering is desired, a third instruction issue unit buffer, IIUB2, may be implemented by inserting a third register and a second multiplexer in each issue lane. For example, in Issue Lane 3, the output of the second multiplexer would be connected to the input of register 511, one input channel of the second multiplexer would be connected to the output of the third register, and the other input channel of the second multiplexer would be connected directly to Syllable 3 output of instruction cache 215. The input of the third register also would be connected directly to Syllable 3 output of instruction cache 215. The second multiplexer and the third register would be controlled by instruction issue controller 550 using a second multiplexer control signal (MUX CONT. 2) and a third load enable signal (LE3). Those skilled in art will recognize that the present invention may be similarly extended to implement additional layers of instruction issue buffers (i.e., IIUB3, IIUB4, IIUB5 and so forth).

As noted above, instruction issue unit 500 only issues instruction bundles towards the issue lanes in each cluster, but does not align syllables and bundles with the proper issue lanes. Alignment and dispersal of bundles and syllables in the issue lanes are performed further "downstream" from instruction issue unit 500 in the execution pipeline. According to an advantageous embodiment of the present invention, data processor 100 comprises alignment and dispersal circuitry between instruction issue unit 500 and the issues lane of clusters 220–222.

Figure 8:
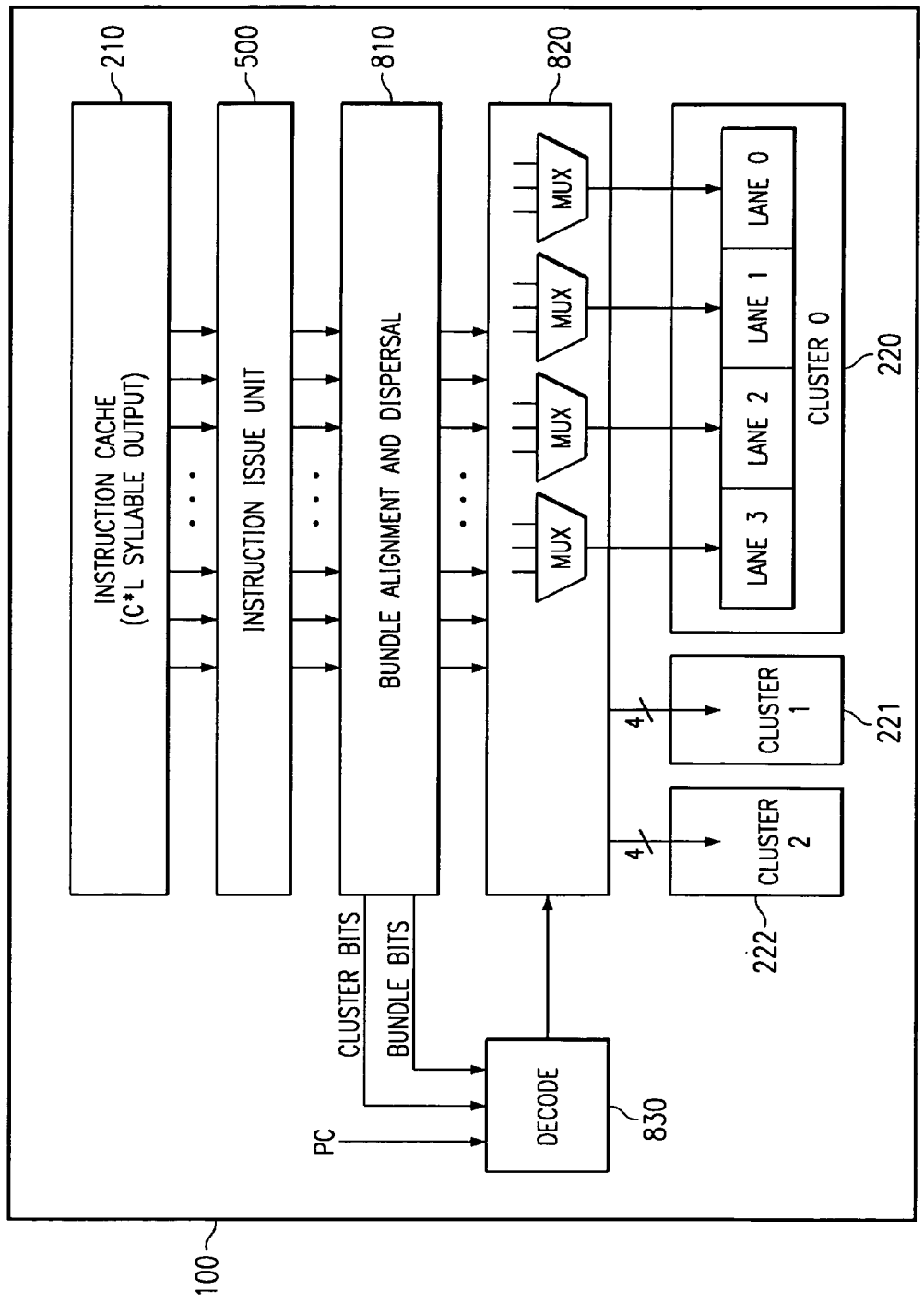
FIG. 8 illustrates bundle alignment and dispersal circuit and selected portions of the exemplary data processor according to one embodiment of the present invention.

FIG. 8 illustrates bundle alignment and dispersal circuit 810 and selected portions of data processor 100 according to one embodiment of the present invention. Bundle alignment and dispersal circuit 810 receives issued instruction bundles from instruction issue unit 500 and aligns syllables in each bundle with the correct ones of Lanes 0–3 in clusters 220–222.

In the illustrated embodiment in FIG. 8, both instruction issue unit 500 and instruction cache 210 are expanded in size over the embodiment illustrated in FIG. 5. In FIG. 5, instruction issue unit 500 receives only 128 bits from instruction cache 210. However, in FIG. 8, instruction cache 210 has a 384 bit output. The output of instruction cache 210 is twelve syllables wide (i.e., C*L=12, where C=3 clusters and L=4 lanes). Instruction issue unit 500, which also is expanded in width, receives all twelve syllables from instruction cache 210 and issues complete bundles to bundle alignment and dispersal circuit 810.

Bundle alignment and dispersal circuit 810 is capable of reordering the syllables in each bundle in order to align the syllables, including null syllables, with the correct issue lanes. Bundle alignment and dispersal circuit 810 corrects the out-of-order alignment of syllables, as demonstrated in FIG. 5. Bundle alignment and dispersal circuit 810 also is a cluster-level alignment device. The outputs of bundle alignment and dispersal circuit 810 are switched through multiplexer block 820 such that any of the syllables in the twelve syllable output of instruction unit 500 may be aligned to any of Lane 0, Lane 1, Lane 2 and Lane 3 in clusters 220–222.

Two bits, a bundle stop bit and a cluster start bit, are reserved in each syllable to indicate the start of the next cluster and the end of a current bundle. If the bundle stop bit is set in a syllable, it means that the current bundle is complete and the next syllable in memory is from the next bundle. If the cluster start bit is set in a syllable, it means that the next syllable in memory is to be loaded in to the next sequential cluster. The positions of the multiplexers in multiplexer block 820 are controlled by decode logic 830, which receives cluster start bits and bundle stop bits. Decode logic 830 also selects the correct lane in a cluster using the bundle address from the program counter (PC).

The key advantages of bundle alignment and dispersal circuit 810 are that no extra instruction bits are used in the most frequent instruction encodings. Bundle alignment and dispersal circuit 810 also does not require decoding of instructions in order to route and disperse operations in pipeline 400. All of the prior art methods of aligning and dispersing bundles and syllables use explicit instruction bits to describe the dispersal of operations to functional units in addition to bit encoding to determine the boundary between bundles. The present invention encodes bundles without using data bits for instruction dispersal. The present invention identifies the boundary between bundles by identifying the Stop bit in the most significant syllable in each bundle. The present invention also uses the memory address of a syllable to determine the routing within the instruction pipeline.

For most operations, there are no address alignment restrictions and the operation can be performed on any of a set of identical functional units. For infrequently used operations, the present invention may impose address alignment restrictions. These can always be satisfied by inserting null operations. In an exemplary embodiment of the present invention, the two least significant bits of a syllable memory address determine the lane of the syllable. Furthermore, infrequent operations may be subject to address restrictions to avoid syllable routing. For example, multiply instructions may be limited to odd memory locations and therefore odd issue lanes.

The forgoing description is suitable for aligning and dispersing instructions in the case of a single execution path (i.e., cluster). However, as illustrated in FIG. 8, data processor 100 subdivides the execution path into multiple clusters (e.g., three), each of which has a separate set of register files and execution units. In data processor 100, instruction alignment and dispersal with a cluster proceed as described above, and bundle alignment and dispersal 810, decode logic 830, and multiplexer block 820 align and disperse bundles to the multiple clusters.

To handle bundle instruction dispersal and alignment for multiple clusters, the present invention reserves one bit of the syllable encoding for a cluster bit, which is used to indicate either the first or last syllable for a cluster depending on the specific implementation. As noted above, one embodiment uses a Stop bit in the most significant syllable to define the cluster boundary. Syllables within a bundle are encoded in cluster order. The syllables for cluster N are all at memory addresses that are lower than those for cluster N+1.

Although the present invention has been described in detail, those skilled in the art should understand that they can make various changes, substitutions and alterations herein without departing from the spirit and scope of the invention in its broadest form.

What is claimed is:

1. A data processor comprising:
  a plurality of execution clusters, each of said execution clusters comprising an instruction execution pipeline having a plurality of processing stages capable of executing instruction bundles each comprising one or more syllables, wherein each of said instruction execution pipelines is a plurality of lanes wide, each of said lanes capable of receiving one or more of said syllables of said instruction bundles;
  an instruction cache capable of storing a plurality of cache lines, each of said cache lines comprising a plurality of the syllables;
  an instruction issue unit capable of receiving fetched ones of said plurality of cache lines and issuing complete instruction bundles toward said execution clusters, wherein at least one complete instruction bundle is issued having an out-of-order alignment; and
  alignment and dispersal circuitry capable of receiving said complete instruction bundles from said instruction issue unit and routing each of said received complete instruction bundles to a correct one of said execution clusters as a function of at least one address bit associated with each of said complete instruction bundles, the alignment and dispersal circuitry also capable of reordering each of the at least one complete instruction bundle having the out-of-order alignment so as to align the syllables in the complete instruction bundle with correct ones of the lanes.

2. The data processor as set forth in claim 1 wherein said alignment and dispersal circuitry routes each of said received complete instruction bundles to said correct execution cluster as a function of at least one address bit associated with at least one syllable in each of said complete instruction bundles.

3. The data processor as set forth in claim 1 wherein said alignment and dispersal circuitry routes each of said received complete instruction bundles to said correct execution cluster as a function of a cluster bit associated with each of said complete instruction bundles.

4. The data processor as set forth in claim 1 wherein said alignment and dispersal circuitry routes each of said received complete instruction bundles to said correct execution cluster as a function of a stop bit associated with at least one syllable in each of said complete instruction bundles.

5. The data processor as set forth in claim 1 wherein said alignment and dispersal circuitry comprises multiplexer circuitry capable of routing each of said received complete instruction bundles to any one of said execution clusters.

6. The data processor as set forth in claim 5 wherein said alignment and dispersal circuitry comprises control logic circuitry capable of controlling said multiplexer circuitry.

7. The data processor as set forth in claim 6 wherein said control logic circuitry controls said multiplexer circuitry as a function of at least one of:
  1) said at least one address bit associated with each of said complete instruction bundles;
  2) at least one address bit associated with at least one syllable in each of said complete instruction bundles; and
  3) a cluster bit associated with each of said complete instruction bundles.

8. The data processor as set forth in claim 1 wherein each execution pipeline is four lanes wide.

9. The data processor as set forth in claim 1 wherein the data processor comprises three execution units.

10. The data processor as set forth in claim 1, wherein each of the execution clusters comprises one or more arithmetic units, a register file, an interface to a memory controller, and an inter-cluster communication interface.

11. A processing system comprising:
  a data processor;
  a memory coupled to said data processor; and
  a plurality of memory-mapped peripheral circuits coupled to said data processor for performing selected functions in association wit said data processor;
  wherein said data processor comprises:
    a plurality of execution clusters, each of said execution clusters comprising an instruction execution pipeline having a plurality of processing stages capable of executing instruction bundles each comprising one or more syllables, wherein each of said instruction execution pipelines is a plurality of lanes wide, each of said lanes capable of receiving one or more of said syllables of said instruction bundles;
    an instruction cache capable of storing a plurality of cache lines, each of said cache lines comprising a plurality of the syllables;
    an instruction issue unit capable of receiving fetched ones of said plurality of cache lines and issuing complete instruction bundles toward said execution clusters, wherein at least one complete instruction bundle is issued having an out-of-order alignment; and
    alignment and dispersal circuitry capable of receiving said complete instruction bundles from said instruction issue unit and routing each of said received complete instruction bundles to a correct one of said execution clusters as a function of at least one address bit associated with each of said complete instruction bundles, the alignment and dispersal circuitry also capable of reordering each of the at least one complete instruction bundle having the out-of-order alignment so as to align the syllables in the complete instruction bundle with correct ones of the lanes.

12. The processing system as set forth in claim 11 wherein said alignment and dispersal circuitry routes each of said received complete instruction bundles to said correct execution cluster as a function of at least one address bit associated with at least one syllable in each of said complete instruction bundles.

13. The processing system as set forth in claim 11 wherein said alignment and dispersal circuitry routes each of said received complete instruction bundles to said correct execution cluster as a function of a cluster bit associated with each of said complete instruction bundles.

14. The processing system as set forth in claim 11 wherein said alignment and dispersal circuitry routes each of said received complete instruction bundles to said correct execution cluster as a function of a stop bit associated with at least one syllable in each of said complete instruction bundles.

15. The processing system as set forth in claim 11 wherein said aligrunent and dispersal circuitry comprises multiplexer circuitry capable of routing each of said received complete instruction bundles to any one of said execution clusters.

16. The processing system as set forth in claim 15 wherein said alignment and dispersal circuitry comprises control logic circuitry capable of controlling said multiplexer circuitry.

17. The processing system as set forth in claim 16 wherein said control logic circuitry controls said multiplexer circuitry as a function of at least one of:
   1) said at least one address bit associated with each of said complete instruction bundles;
   2) at least one address bit associated with at least one syllable in each of said complete instruction bundles; and
   3) a cluster bit associated with each of said complete instruction bundles.

18. The processing system as set forth in claim 11 wherein each execution pipeline is four lanes wide.

19. The processing system as set forth in claim 11 wherein the data processor comprises three execution units.

20. The processing system as set forth in claim 11, wherein each of the execution clusters comprises one or more arithmetic units, a register file, an interface to a memory controller, and an inter-cluster communication interface.

21. For use in a data processor comprising a plurality of execution clusters, each of the execution clusters comprising an instruction execution pipeline having a plurality of processing stages capable of executing instruction bundles each comprising one or more syllables, wherein each of the instruction execution pipelines is a plurality of lanes wide, each of the lanes capable of receiving one or more of the syllables of the instruction bundles, a method of routing instruction bundles into the lanes in the execution clusters comprising the steps of:
   fetching cache lines from an instruction cache, each of the cache lines comprising a plurality of the syllables;
   issuing complete instruction bundles toward the execution clusters, wherein at least one complete instruction bundle is issued having an out-of-order alignment;
   reordering each of the at least one complete instruction bundle having the out-of-order alignment so as to align the syllables in the complete instruction bundle with correct ones of the lanes; and
   routing each of the complete instruction bundles to a correct one of the execution clusters as a function of at least one of:
   1) at least one address bit associated with each of the complete instruction bundles;
   2) at least one address bit associated with at least one syllable in each of the complete instruction bundles; and
   3) a cluster bit associated with each of the complete instruction bundles.

22. The method as set forth in claim 21 wherein each execution pipeline is four lanes wide and the data processor comprises three execution units.

* * * * *